United States Patent
Lee et al.

(10) Patent No.: US 8,177,366 B2
(45) Date of Patent: May 15, 2012

(54) STEREOSCOPIC IMAGE PROJECTING SYSTEM USING CIRCULARLY POLARIZED FILTER MODULE

(75) Inventors: Young Hoon Lee, Seoul (KR); Yong Bi Jung, Seoul (KR)

(73) Assignee: Masterimage 3D Asia, LLC, Seoul (KR)

( * ) Notice: Subject to any disclaimer, the term of this patent is extended or adjusted under 35 U.S.C. 154(b) by 306 days.

(21) Appl. No.: 12/513,590

(22) PCT Filed: Nov. 6, 2007

(86) PCT No.: PCT/KR2007/005578
§ 371 (c)(1),
(2), (4) Date: Sep. 23, 2009

(87) PCT Pub. No.: WO2008/056929
PCT Pub. Date: May 15, 2008

(65) Prior Publication Data
US 2010/0079728 A1 Apr. 1, 2010

(30) Foreign Application Priority Data
Nov. 6, 2006 (KR) .................. 10-2006-0109066

(51) Int. Cl.
*G03B 21/00* (2006.01)
(52) U.S. Cl. ......... 353/7; 353/6; 353/8; 353/20; 353/30; 353/31; 353/33; 353/38; 353/79; 353/89; 353/122; 349/5; 349/7; 349/8; 349/9

(58) Field of Classification Search ............... 353/6, 7, 353/8, 20, 30, 31, 33, 38, 79, 89, 119, 122; 349/5, 7, 8, 9, 96, 114, 115; 359/462, 464, 359/465, 472
See application file for complete search history.

(56) References Cited

U.S. PATENT DOCUMENTS

| | | | | |
|---|---|---|---|---|
| 4,792,850 A * | 12/1988 | Liptoh et al. | .................. | 348/57 |
| 6,113,239 A * | 9/2000 | Sampsell et al. | ................ | 353/31 |
| 6,819,365 B1 * | 11/2004 | Peng | .................. | 349/9 |
| 6,822,712 B2 * | 11/2004 | Suzuki et al. | ................. | 349/115 |
| 7,492,516 B2 * | 2/2009 | Takahashi et al. | ........ | 359/489.01 |
| 7,705,935 B2 * | 4/2010 | Gaudreau | .................. | 349/96 |
| 2003/0112507 A1 | 6/2003 | Divelbiss et al. | | |
| 2005/0062906 A1 * | 3/2005 | Ishizaki | .................. | 349/96 |
| 2005/0237487 A1 | 10/2005 | Chang | | |
| 2006/0012754 A1 * | 1/2006 | Larson et al. | .................. | 353/20 |
| 2007/0002132 A1 * | 1/2007 | Kim et al. | ................. | 348/57 |
| 2008/0055546 A1 * | 3/2008 | DeCusatis et al. | ............... | 353/7 |
| 2008/0143965 A1 * | 6/2008 | Cowan et al. | .................. | 353/8 |

FOREIGN PATENT DOCUMENTS

| | | |
|---|---|---|
| GB | 616273 A | 1/1949 |
| GB | 732472 A | 6/1955 |
| JP | 03-063619 A | 3/1991 |
| JP | 10-153755 A | 6/1998 |
| JP | 2001-174750 | 6/2001 |
| JP | 2006047601 A | 2/2006 |
| JP | 2006-235145 | 9/2006 |
| JP | 2006235145 A | 9/2006 |
| KR | 10-2005-0092882 | 9/2005 |

* cited by examiner

*Primary Examiner* — Georgia Y Epps
*Assistant Examiner* — Sultan Chowdhury
(74) *Attorney, Agent, or Firm* — Maschoff Gilmore & Israelsen

(57) ABSTRACT

A stereoscopic image projection system using a circular polarization filter module is provided. Even though this system uses a single projector, it allows left and right images to have different polarization directions using the circular polarization filter module, thereby reducing crosstalk compared to an LCD-shutter-based system.

20 Claims, 7 Drawing Sheets

STEREOSCOPIC IMAGE PROJECTING SYSTEM USING CIRCULARLY POLARIZED FILTER MODULE

TECHNICAL FIELD

The present invention relates to a stereoscopic image projection system, and more particularly, to a stereoscopic image projection system using a circular polarization filter module according to a single projector circular polarization method.

BACKGROUND ART

A general method for implementing stereoscopic images (or 3D images) is to emit different images to two human eyes. Stereoscopic displays are mainly divided into glasses stereoscopic displays and glassless (naked-eye) stereoscopic displays according to whether or not it is necessary for the viewer to wear glasses in order to emit different images to their two eyes, respectively.

Especially, projection of stereoscopic images implemented through a large screen as in a movie theater typically uses a polarization method in which left and right images separately pass through polarization glasses having left and right polarization lenses with orthogonal polarization directions. This method implements stereoscopic image projection in the following manner. First, images are captured using two cameras. The images are given orthogonal polarization directions through polarizers and their overlapping images are then displayed on a screen. Then, the viewer views the images captured using the two cameras with their two eyes through polarization glasses.

Figure 1:
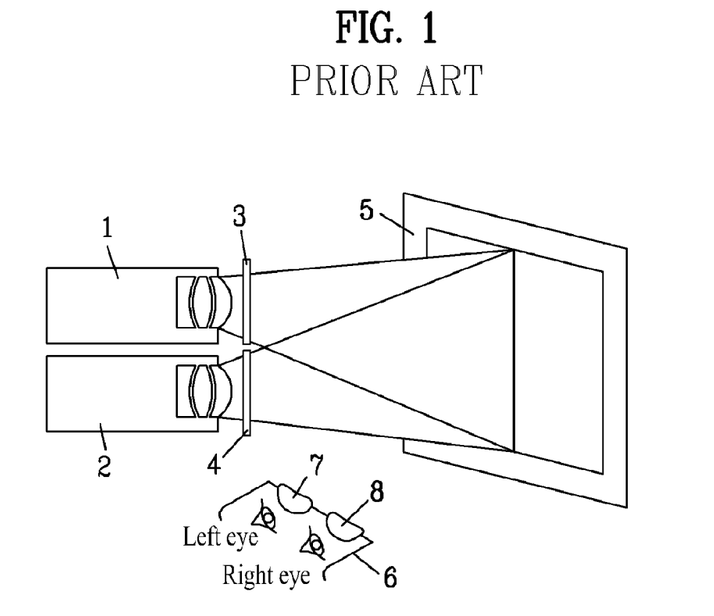
FIG. 1 illustrates the structure of a conventional dual projector system for stereoscopic image projection.

FIG. 1 illustrates the structure of a conventional dual projector system for stereoscopic image projection.

To provide stereoscopic image projection according to the polarization method, the conventional dual projector system uses two conventional two-dimensional (2D) projectors 1 and 2. One of the 2D projectors 1 emits left images and the other 2D projector 2 emits right images. The left and right images are then projected on a screen 5 after passing through polarization filters 3 and 4 with orthogonal polarization directions. The left and right images overlapping on the screen 5 are then viewed separately by the two eyes of the viewer through left and right image lenses 7 and 8 of polarization glasses 6 worn by the viewer, so that the viewer feels as if they view 3D images.

The conventional dual projector stereoscopic image projection system is very expensive since it uses two 2D image projectors and two polarization plates as described above and also includes peripheral devices. The number of projectors required to project stereoscopic films in a theater is twice the number of the movies since two projectors are required for each movie. The positions of left and right images projected on the screen vary depending on the positions of the two projectors. Therefore, incorrect adjustment of the positions of the two projectors reduces the conformity of stereoscopic images.

Thus, there has been a need to provide a single-projector system for stereoscopic image projection. Systems based on a method of dividing the area of the single projector LCD module and a method of using an LCD shutter has been developed to meet the need.

Figure 2:
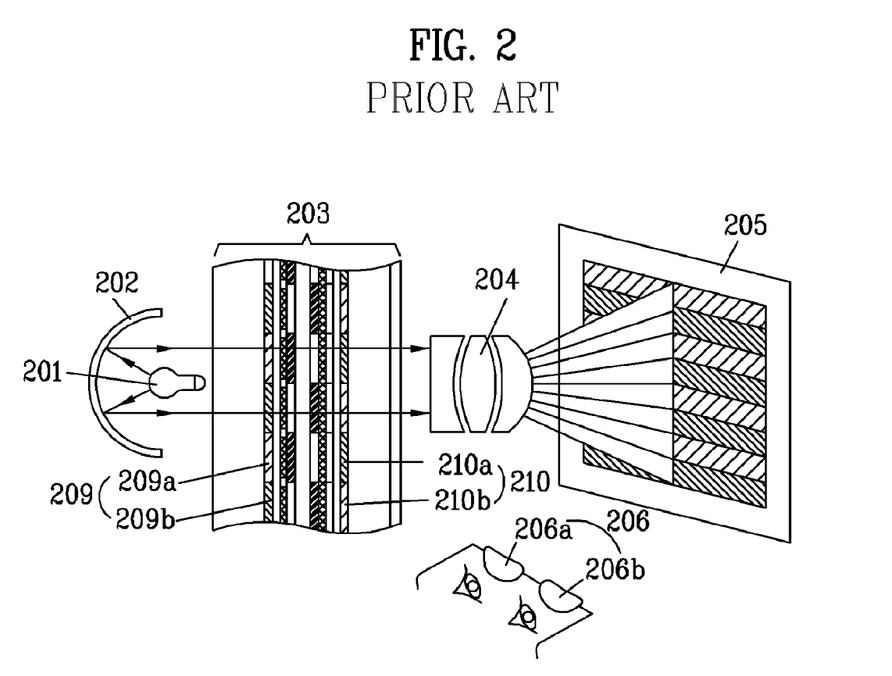
FIG. 2 illustrates the structure of a conventional system for stereoscopic image projection based on a method of dividing the area of an LCD module.

FIG. 2 illustrates the structure of the conventional system for stereoscopic image projection based on the method of dividing the LCD module.

The conventional stereoscopic image projection system shown in FIG. 2 operates in the following manner. First, light generated by a light source 201 is reflected using a reflecting mirror 202. The reflected light passes through an LCD module 203, which then outputs left and right images with different polarization directions. The left and right images are projected on a screen 205 through a condenser lens 204. The left and right images projected on the screen 205 are separated by passing through left and right image lenses 206a and 206b of polarization glasses 206 worn by the viewer, respectively, so that the viewer feels as if they view 3D images.

The following is a detailed description of how left and right images come to have different polarization directions as light passes through the LCD module 203.

The LCD module 203 includes two polarization films 209 and 210. Each of the polarization films 209 and 210 includes pairs of two regions with orthogonal polarization directions that are alternately arranged in a vertical direction. Specifically, the polarization film 209 includes pairs of two regions, first polarization regions 209a and second polarization regions 209b, and the polarization film 210 includes pairs of two regions, third polarization regions 210a and fourth polarization regions 210b. A beam displaying left images included in the light reflected by the reflecting mirror 202 passes through the first polarization regions 209a of one of the polarization films 209 included in the LCD module 203, while a beam displaying right images included in the light reflected by the reflecting mirror 202 passes through the second polarization regions 209b of the same polarization film 209, which have a phase different of 90 degrees with the first polarization regions 209a, so that the reflected beams displaying left and right images come to have orthogonal polarization directions. Then, as the liquid crystal is driven according to whether or not each image is to be displayed, the emitted left images pass through the third polarization regions 210a included in the other polarization film 210, which have a phase difference of 90 degrees with the first polarization regions 209a, while the emitted right images pass through the fourth polarization regions 210b included in the other polarization film 210, which have a phase difference of 90 degrees with the second polarization regions 209b, so that the left and right images come to have orthogonal polarization directions. Then, the beams of left and right images are projected on the screen 205 after passing through the condenser lens 204. As a result, left and right images with orthogonal polarization directions are alternately arranged on the screen 205. The viewer separately recognizes the left and right images through the polarization glasses 206.

The method of projecting stereoscopic images through division of the area of the LCD module 203 has a problem that the overall resolution is reduced since the projected area is divided into left image projected regions and right image projected regions. That is, as the total area of each of the left and right images projected on the screen decreases, the resolution of each image, which has passed through each lens of the polarization glasses, must be reduced, which limits its application to movie theaters with large screens.

In addition, left and right images must correctly pass through their defined regions. Otherwise, the stereoscopic image quality will be reduced. It is difficult to avoid this problem when left and right images are processed separately in space. When stereoscopic images are projected on a large screen as in a movie theater, it is not easy to adjust the positions of left and right images projected on the screen since small position mismatching at the projector will significantly reduce the conformity of stereoscopic images at the viewer.

Figure 3:
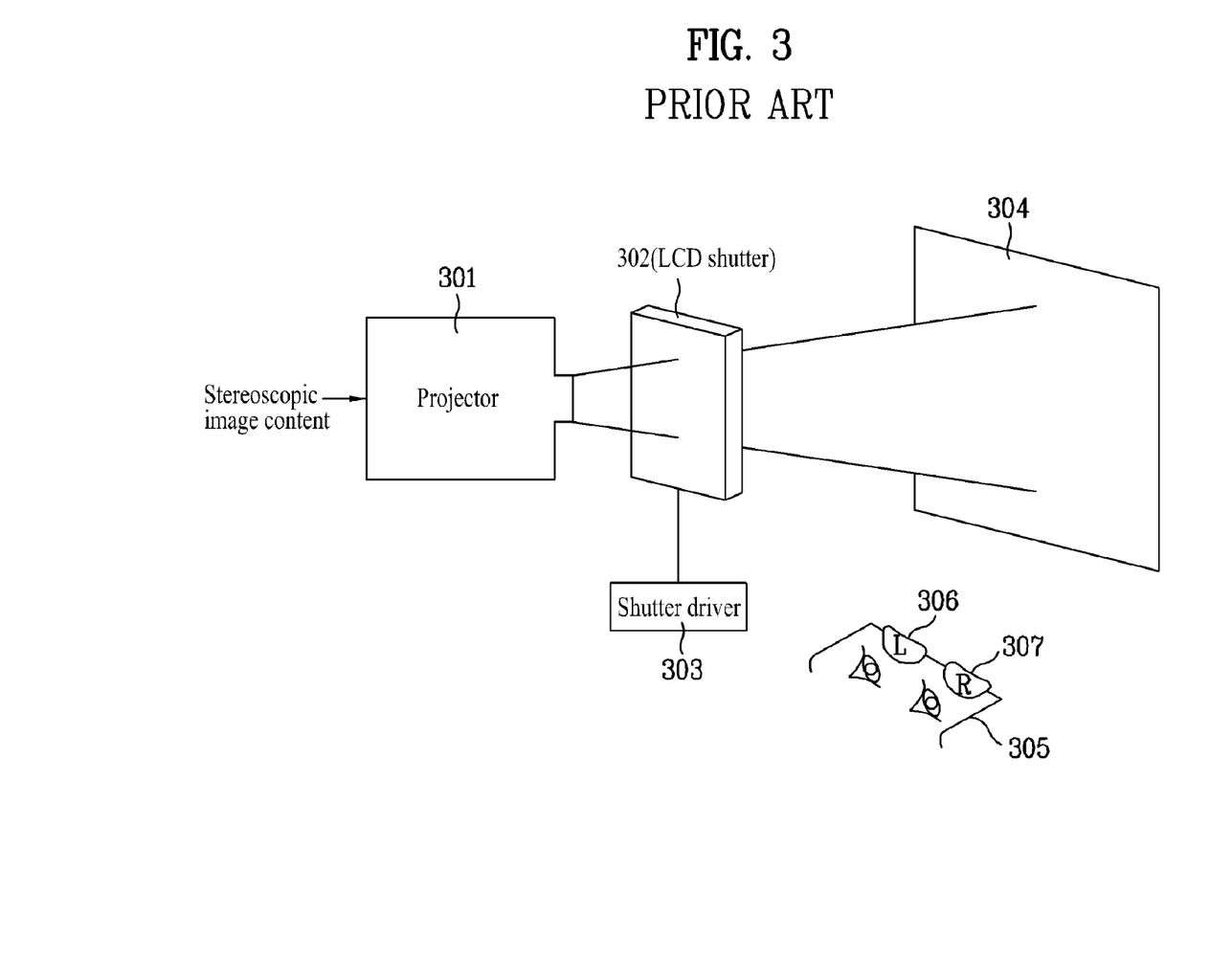
FIG. 3 illustrates the structure of a conventional LCD-shutter-based system for stereoscopic image projection.

FIG. 3 illustrates the structure of a conventional LCD-shutter-based system for stereoscopic image projection.

To overcome the problem that may occur when left and right images are spatially divided in the single projector method, the method shown in FIG. 3 produces stereoscopic image content including alternating left and right images. An LCD shutter 302 is used to cause the left and right images to have different polarization directions.

Specifically, in the method of FIG. 3, left and right images are alternately stored in the content. When a projector 301 emits images according to the content, the LCD shutter 302 is driven to have the same polarization direction as that of left images at the times when the projector 301 emits the left images and is driven to have a polarization direction different from that of the left images at the times when the projector 301 emits the right images. This operation can be performed by a shutter driver 303 which drives the LCD shutter 302.

However, this stereoscopic image projection system using the LCD shutter has a problem that the response delay of the LCD shutter when it is driven causes crosstalk between left and right images. Especially, the time during which alternating left and right images are switched must be short enough to not be noticed by a human. The slow response time of the LCD shutter will be a serious problem when left and right images are quickly switched.

In addition, there is a need to provide a technology for replacing the LCD shutter with different means for increasing the polarization ratio, since the polarization ratio of left and right images of the LCD shutter is not so high.

TECHNICAL PROBLEM

An object of the present invention devised to solve the problem lies on providing a stereoscopic image projector system, an apparatus for stereoscopic image projection, and a stereoscopic image projection system including the stereoscopic image projector system and the apparatus, wherein single projector type stereoscopic image projection is implemented using a circular polarization filter module so that the number of projectors required for stereoscopic image projection is reduced and left and right images are also divided in time so as not to cause crosstalk between the images.

Another object of the present invention devised to solve the problem lies on providing a system which uses a circular polarization filter module that rotates to selectively polarize left and right images, wherein the synchronization of rotation of the circular polarization filter module is controlled taking into consideration the sizes of left and right images, thereby achieving stereoscopic image projection with a higher quality.

TECHNICAL SOLUTION

An embodiment of the present invention to achieve the above objects provides a stereoscopic image projector system for a stereoscopic image projection system using a polarization method, the stereoscopic image projector system including a projector for sequentially emitting left and right images; a circular polarization filter module including a left image polarization filter and a right image polarization filter; and a filter driver for rotating and driving the circular polarization filter module according to timing synchronization of left and right image emissions of the projector.

In this embodiment, the stereoscopic image projector system may further include a synchronizer for acquiring timing synchronization of left and right image emissions of the projector and providing the timing synchronization to the filter driver and a frame for fixing and adjusting positions of the projector and the circular polarization filter module.

The frame may control the positions of the projector and the circular polarization filter module to control two-dimensional (2D) or three-dimensional (3D) image projection. Preferably, the circular polarization filter module further includes a light shielding region at a boundary between the left image polarization filter and the right image polarization filter.

The projector may receive stereoscopic image content, including the left and right images sequentially stored in the stereoscopic image content, and continuously emits the content. By rotating the circular polarization filter module, the circular polarization filter module may be controlled such that the left image polarization filter is located at an emission hole of the projector when the projector emits left images and the right image polarization filter is located at the emission hole of the projector when the projector emits right images.

The circular polarization filter module may further include a sensor for detecting whether or not the left image polarization filter is located at the emission hole of the projector when the projector emits left images and whether or not the right image polarization filter is located at the emission hole of the projector when the projector emits right images. In this case, a position of the sensor is preferably determined taking into consideration the size of a left and right image emitted by the projector. In a preferred embodiment of the invention, the circular polarization filter module may further include measurement means for measuring the size of a left and right image emitted by the projector; and position determination means for determining the position of the sensor according to the measurement of the measurement means.

Another embodiment of the invention provides a polarization-based stereoscopic image projection system using a projector for sequentially emitting left and right images, the stereoscopic image projection system including a circular polarization filter module including a left image polarization filter and a right image polarization filter; and a filter driver for rotating and driving the circular polarization filter module according to timing synchronization of left and right image emissions of the projector.

Also in this embodiment, the stereoscopic image projection system may further include a synchronizer for acquiring timing synchronization of left and right image emissions of the projector and providing the timing synchronization to the filter driver and a frame for fixing and adjusting positions of the projector and the circular polarization filter module.

The frame may control the positions of the projector and the circular polarization filter module to control two-dimensional (2D) or three-dimensional (3D) image projection. Preferably, the circular polarization filter module further includes a light shielding region at a boundary between the left image polarization filter and the right image polarization filter.

In addition, by rotating the circular polarization filter module, the circular polarization filter module may be controlled such that the left image polarization filter is located at an emission hole of the projector when the projector emits left images and the right image polarization filter is located at the emission hole of the projector when the projector emits right images.

Another embodiment of the invention provides a stereoscopic image projection system including a stereoscopic image projector system for emitting left and right images according to a polarization method; a screen on which the left and right images are projected; and polarization glasses through which the left and right images selectively pass, the stereoscopic image projector system including a projector for sequentially emitting left and right images; a circular polarization filter module including a left image polarization filter and a right image polarization filter; and a filter driver for rotating and driving the circular polarization filter module according to timing synchronization of left and right image emissions of the projector.

ADVANTAGEOUS EFFECTS

According to the embodiments of the invention, the system uses only one projector to increase its utilization in viewing rooms of a movie theater or the like and to reduce installation costs and can project stereoscopic images with a high conformity of left and right images and a wide viewing angle while reducing crosstalk compared to the LCD-shutter-based system.

In addition, the position of the circular polarization filter module is changed using the frame not only to allow 3D image projection but also to allow general 2D image projection and the light shielding region is inserted between the left and right image filters of the circular polarization filter module, thereby further reducing crosstalk.

Further, the sensor is used to efficiently detect the rotation position of the circular polarization filter module at the times when left and right images are switched. Especially, the position of the sensor is set taking into consideration the sizes of images, thereby further improving the stereoscopic image quality.

Furthermore, it is easy to use the stereoscopic image projector system according to the embodiments of the invention since it is easily installed at the front of the existing projector.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

The present invention suggests that a method of sequentially emitting left and right images be used to allow single projector stereoscopic image projection and a circular polarization filter module be used to polarize left and right images differently. Using the circular polarization filter module to polarize left and right images can reduce the crosstalk problem in the LCD shutter method. Using the circular polarization filter also has an advantage in that it can increase the viewing angle of stereoscopic images, compared to when linearly polarization filters are used.

Figure 4:
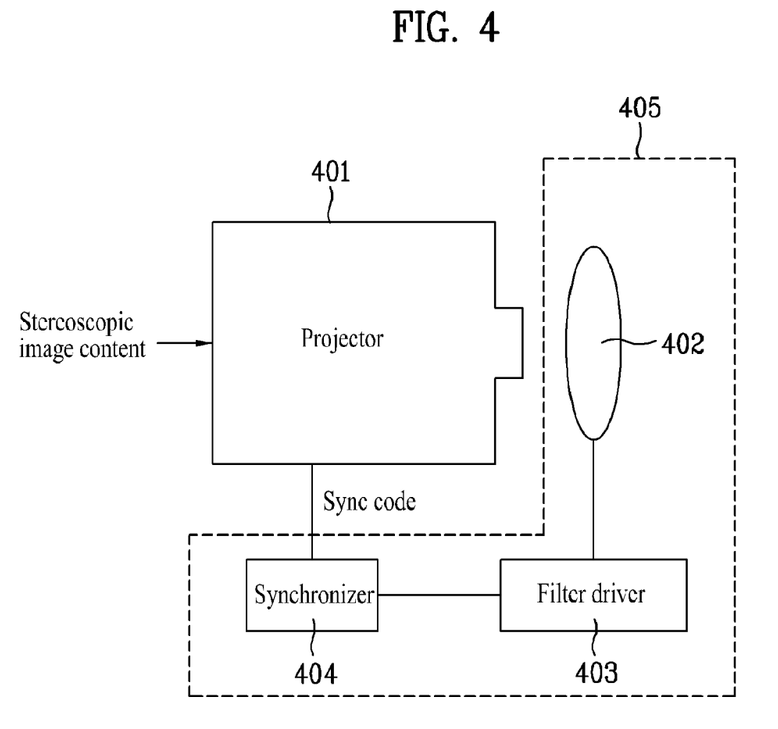
FIG. 4 illustrates the structure of a stereoscopic image projector system used in a single projector circular filter type system according to an embodiment of the invention.

FIG. 4 illustrates the structure of a stereoscopic image projector system used in a single projector circular filter type system according to an embodiment of the invention.

As shown in FIG. 4, the stereoscopic image projector system according to the embodiment of the invention includes a single projector 401, a circular polarization filter module 402, and a filter driver 403. The projector 401 sequentially emits left and right images. The circular polarization filter module 402 includes a left image polarization filter and a right image polarization filter. The filter driver 403 rotates and drives the circular polarization filter module 402 according to timing synchronization of the left image emission and right image emission of the projector 401. The stereoscopic image projector system may further include a synchronizer 404 for acquiring timing synchronization of the left image emission and right image emission of the projector 401 and transferring the timing synchronization to the filter driver 403 as shown in FIG. 4. Reference will now be made to detailed operations of the stereoscopic image projector system.

First, the projector 401 receives stereoscopic image content, including left images and right images sequentially (or alternately) stored in the stereoscopic image content, and continuously emit the content. This indicates that a conventional projector for projecting 2D images can be directly used as the projector 401. That is, the projector 401 sequentially emits left images and right images according to information of the received stereoscopic image content.

By rotating the circular polarization filter module 402 which includes a left image polarization filter and a right image polarization filter as described above, the circular polarization filter module 402 is controlled such that the left image polarizing filter is located at an emission hole of the projector 401 at the time when the projector 401 emits left images and the right image polarization filter is located at the emission hole of the projector 401 at the time when the projector 401 emits right images. To accomplish this, the synchronizer 404 must be able to acquire the timing of switching between left and right images in the stereoscopic image content input to the projector 401. The synchronizer 404 controls the filter driver 403 to adjust the timing of driving the circular polarization filter module 402 according to the acquired timing information. The timing synchronization can be set to detect a synchronization signal containing the timing synchronization information from a High Definition-Serial Digital Interface (HD-SDI) port for transmission of stereoscopic image content, a GPIO port, or any other corresponding port.

The stereoscopic image projector system may further include a frame (not shown) for fixing and adjusting the positions of the projector 401 and the circular polarization filter module 402. The frame can control the position of the projector 401 and/or the circular polarization filter module 402 to control 2D or 3D image projection. For example, in the case of 2D image projection, the frame lowers the position of the circular polarization filter module 402 to control images emitted by the projector 401 not to pass through the circular polarization filter module 402.

Since a conventional projector can be directly used as the projector 401 in the stereoscopic image projector system described above, the circular polarization filter module 402 and the filter driver 403, preferably together with the synchronizer 404 and/or the frame (not shown), can constitute an apparatus for stereoscopic image projector systems according to another embodiment of the invention. This apparatus for stereoscopic image projection systems can be easily mounted on the front side of an existing projector. Thus, the apparatus for stereoscopic image projector systems can be compatible with a variety of projectors.

The following is a description of a preferable structure of the circular polarization filter module 402.

Figure 5:
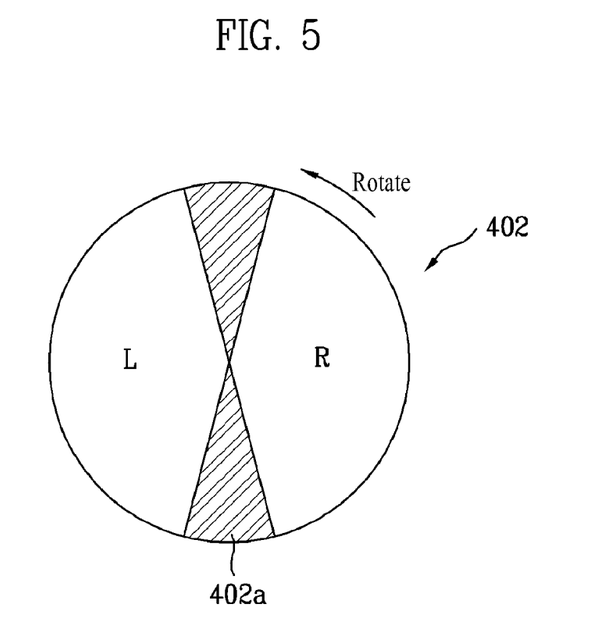
FIG. 5 illustrates a preferable structure of a circular polarization filter module used in a single projector circular polarization filter type system according to an embodiment of the invention.

FIG. 5 illustrates a preferable structure of the circular polarization filter module used in the single projector circular polarization filter type system according to an embodiment of the invention.

As shown in FIG. 5, the circular polarization filter module 402 according to the embodiment of the invention includes a left image polarization filter for left image polarization (denoted by "L" in FIG. 5) and a right image polarization filter for right image polarization (denoted by "R" in FIG. 5) and preferably further includes a light shielding region 402*a*.

Generally, the circular polarization filter includes a linear polarization filter and a quarter phase difference plate to convert incident light into right-handed or left-handed circularly polarized light. Stereoscopic display using circular polarization filters has an advantage over that using linearly polarization filters in that the viewer can view projected images in 3D even when they significantly tilt their head to the left or right as described above. However, stereoscopic display using circular polarization filters also has a problem in that crosstalk easily occurs between colors of left and right images of stereoscopic pictures.

Thus, the light shielding region 402*a* is inserted as shown in FIG. 5 to reduce crosstalk between left and right images emitted by the projector at the time when the left and right images are switched. To accomplish this, it is preferable that the light shielding region 402*a* be located at the emission hole of the projector at the time when left and right images of the projector are switched.

Although FIG. 5 shows that one circular polarization filter module 402 includes one left image filter L and a right image filter R, the circular polarization filter module 420 may include a plurality of left image filters and a plurality of right image filters. For example, when the circular polarization filter module includes two left image filters and two right image filters, the speed at which the filter driver drives the circular polarization filter module can be reduced to half of that of the case of FIG. 5.

It is preferable that each filter be in the form of a fan with a decreasing central angle at the center of the circular polarization filter module as the number of left image filters and the number of right image filters increase as in the above embodiment. If the central angles of the left image filter L and the right image filter R are large, the stereoscopic image quality may be reduced due to mismatching between the polarization angles of the circular polarization filter module and the polarization glasses as the circular polarization filter module rotates. Accordingly, a preferred embodiment of the invention suggests that the circular polarization filter module include an appropriate number of left image polarization filters L and right image polarization filters R with the same fan shape to reduce the central angle, thereby minimizing the reduction of the stereoscopic image quality due to mismatching between the polarization angles.

One method of increasing the numbers of left image polarization filters L and right image polarization filters R is to repeatedly arrange left image polarization filters L and right image polarization filters R alternately, for example in the order of L, R, L, R, . . . and another method is to repeat the same-side image filters and then to repeat the opposite-side image filters, for example in the order of L, L, L, R, R, R, . . . , R. Repeating left image filters L and right image filters R in this manner can also prevent the reduction of the stereoscopic image quality due to the mismatching between the polarization angles of the circular polarization filter module and the polarization glasses. Although any number of left or right image filters can be repeated, it is preferable that the left image filter region L be divided into 6 equal sections and the right image filter region R be divided into 6 equal sections taking into consideration flickering due to the interval between each filter section in the circular polarization filter module. The present invention is not necessarily limited to this example and can set any appropriate number of filter sections which reasonably balances the polarization direction mismatching problem with the flickering problem.

In an embodiment of the invention, the circular polarization filter module may further include a sensor for detecting whether or not a left image polarization filter is located at the emission hole of the projector at the time when the projector emits left images and whether or not a right image polarization filter is located at the emission hole of the projector at the time when the projector emits right images. The concept of this sensor for the circular polarization filter module will now be described in more detail with reference to the drawings.

Figure 6:
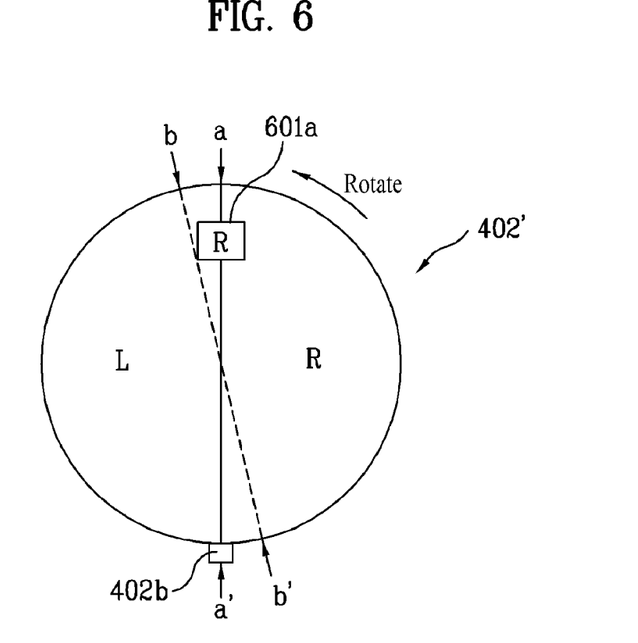
FIG. 6 illustrates the operation and position of a sensor used for a circular polarization filter module according to a preferred embodiment of the invention.

FIG. 6 illustrates the operation and position of a sensor used for a circular polarization filter module according to a preferred embodiment of the invention.

In FIG. 6, it is assumed that the projector emits an image 601*a* at the timing of switching from left to right images (L->R). The circular polarization filter module 402' can be set to rotate such that its region located at the emission hole of the projector is switched from the left image polarization filter region L to the right image polarization filter region R at the time when the image is switched from left to right images. In the case of this setting of the circular polarization filter module 402', the sensor can be set to detect whether or not the boundary between the left and right polarization regions of the circular polarization filter module 402' is located at a position a-a' shown in FIG. 6 at the time.

However, as can be seen from FIG. 6, if the boundary between the left and right polarization regions of the circular polarization filter module 402' is located at a position a-a' shown in FIG. 6 at the time when the image 601a emitted by the projector is switched from left to right images, the circular polarization filter module 402' cannot properly polarize a right image during a duration in which the projector emits the right image. That is, additional crosstalk may occur if the position of the boundary between the left and right polarization regions of the circular polarization filter module 402' at the timing of switching between left and right images is set without taking into consideration the size of the image 601a.

Thus, a preferred embodiment of the invention suggests that the circular polarization filter boundary position at the timing of switching between left and right images be set taking into consideration the size of the images. Specifically, in the above example, the boundary between the left and right polarization regions of the circular polarization filter module 402' can be set to be located at a position b-b' rather than the position a-a' shown in FIG. 6 at the time when the image 601a emitted by the projector is switched from left to right images. This embodiment also suggests that the sensor 402b for detecting the rotation position of the circular polarization filter module 402' be set to be located at the position b or b'. This setting of the position of the sensor 402b can prevent crosstalk caused during a period of time corresponding to the size of the image 601a.

While it is assumed in the example of FIG. 6 that images have a uniform size, images may have various sizes according to the type of the projector or the like, which is described below.

Figure 7:
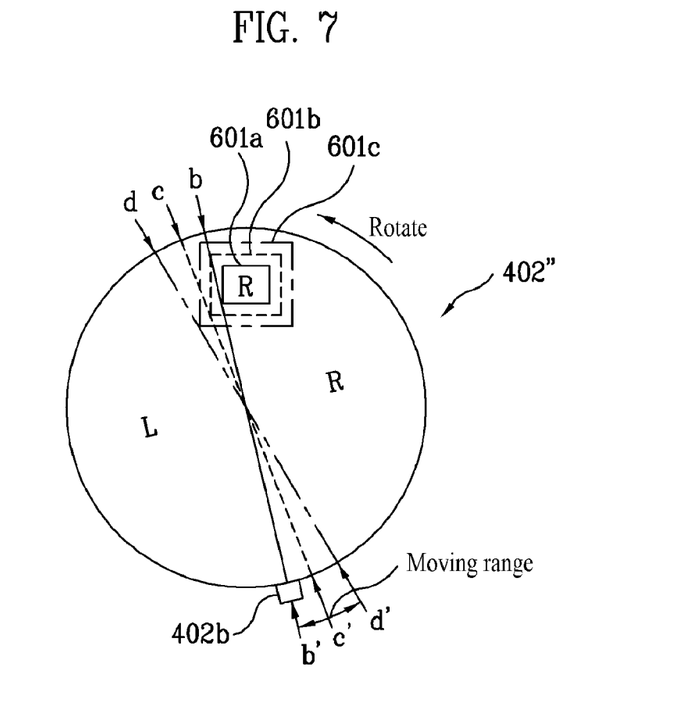
FIG. 7 is a drawing for explaining in detail a method for determining the position of a sensor used in a circular polarization filter module taking into consideration the sizes of images according to a preferred embodiment of the invention.

FIG. 7 is a drawing for explaining in detail a method for determining the position of a sensor used in a circular polarization filter module taking into consideration the sizes of images according to a preferred embodiment of the invention.

Specifically, FIG. 7 illustrates that the projector can emit various images such as an image 601a, an image 601b, and an image 601c. The setting of the position of the boundary between a left image polarization filter region L and a right image polarization filter region R of a circular polarization filter module 402" at the time when images are switched from left to right images can be changed according to the size of the images. It is preferable that the position of a sensor 402b be also adjusted according to the changed boundary position. For example, it is preferable in FIG. 7 that the sensor be located at a position b or b' when the image 601a is emitted, the sensor be located at a position c or c' when the image 601b is emitted, and the sensor be located at a position d or d' when the image 601c is emitted. A preferred embodiment of the invention suggests that the position of the sensor be adjusted according to the various image sizes in this manner.

Figure 8:
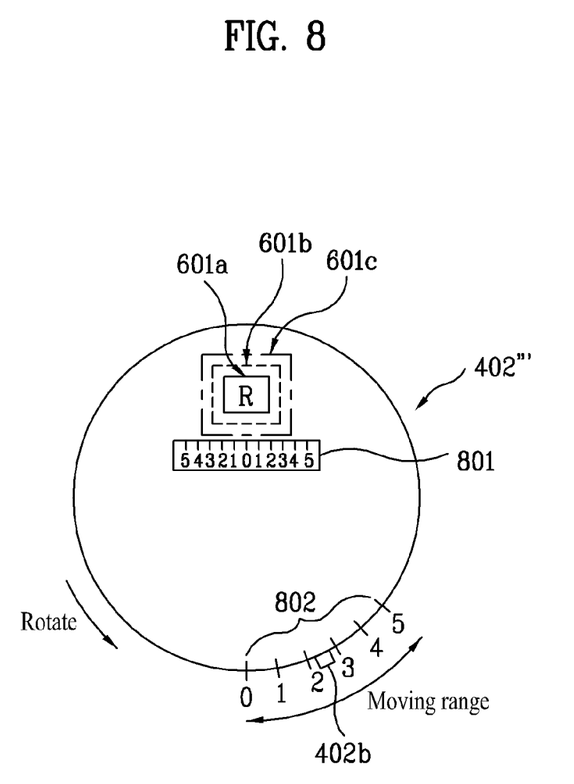
FIG. 8 illustrates a structure for efficiently determining the size of an image and the position of the sensor based on the image size according to a preferred embodiment of the invention.

FIG. 8 illustrates a structure for efficiently determining the size of an image and the position of the sensor based on the image size according to a preferred embodiment of the invention.

As described above with reference to FIG. 7, it is preferable that, when the size of the images is changed, the position of the sensor be adjusted according to the changed image size. However, when the position of a sensor is roughly adjusted on a projector used in movie theaters, the adjusted position may be incorrect, thereby reducing the stereoscopic image quality.

Accordingly, a more preferred embodiment of the invention suggests that a circular polarization filter module 402''' further include measurement means 801 for measuring the size of an image and position determination means 802 for determining the position of a sensor 402b according to the measurement of the measurement means 801 as shown in FIG. 8. Specifically, in the example of FIG. 8, if image sizes 0, 1, 2, 3, 4, 5, . . . are measured through the measurement means, the sensor 402b can be located at positions 0, 1, 2, 3, 4, 5, . . . corresponding to the measured image sizes, respectively.

Although FIG. 8 shows a method in which the image size and the corresponding sensor position are quantitatively set using a type of scale to illustrate the preferred embodiment of the invention, any means for determining the image size and the corresponding sensor position can be used as the measurement means and the position determination means in the invention.

The above methods according to the embodiments of the invention will now be described in comparison with the conventional LCD shutter method.

Figure 9:
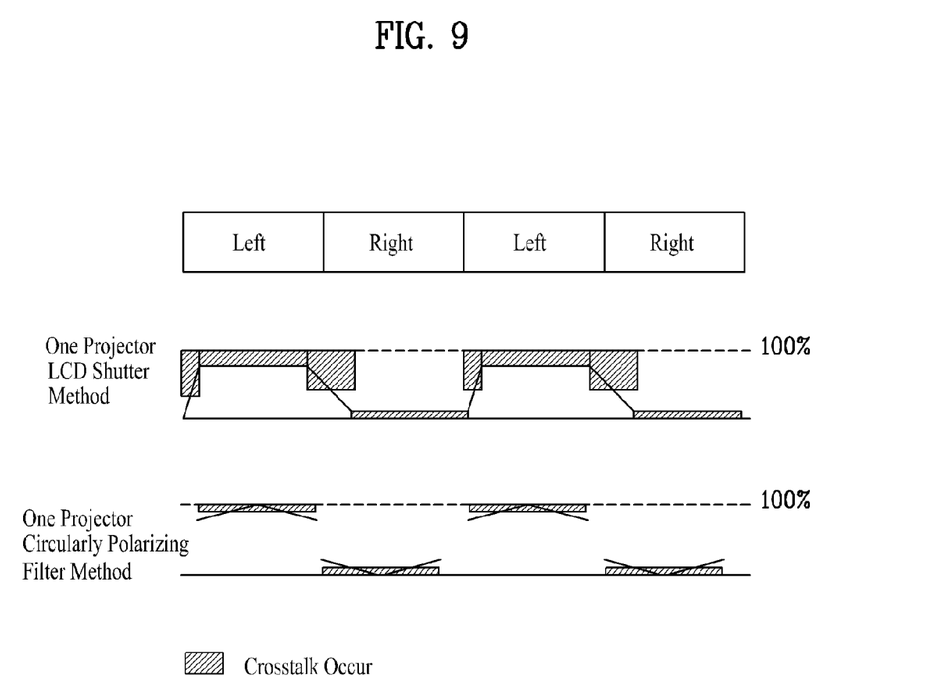
FIG. 9 illustrates comparisons of the extents of crosstalk occurring between left and right images according to the conventional LCD shutter method and according to the single projector circular polarization filter methods of the embodiments of the invention.

FIG. 9 illustrates comparisons of the extents of crosstalk occurring between left and right images according to the conventional LCD shutter method and according to the single projector circular polarization filter methods of the embodiments of the invention.

"Left" and "Right" in the top of FIG. 9 denote time intervals during which the projector emits left and right images, respectively. It can be seen from FIG. 9 that, when left and right images are emitted alternately in this manner, relatively great crosstalk occurs at the timings of switching between left and right images if each image is polarized using the LCD shutter as shown in FIG. 3. Generally, the LCD shutter responds more slowly at falling times than at rising times. In the example of FIG. 9, left images are projected during rising cycles of the LCD and right images are projected during falling cycles so that greater crosstalk occurs at the timings of switching from left to right images than at the timings of switching from right to left images. Different images from those shown in FIG. 9 may also be projected during the cycles. On the other hand, as shown in FIG. 9, almost no crosstalk occurs at the timings of switching between left and right images if the circular polarization filter module according to the embodiment of the invention is used. Setting the light shielding region as shown in FIG. 5 can further reduce the possibility of occurrence of crosstalk.

As shown in FIG. 9, in the case of the method using the LCD shutter, crosstalk occurring in cycles during which left images are emitted and cycles during which right images are emitted, other than the switching cycles, is also greater than in the case of the method using the circular polarization filter module according to the embodiment of the invention since the LCD shutter method has a lower polarization ratio of images for one of the left or right sides than the circular polarization method according to the invention.

Accordingly, using the single projector according to the invention, it is possible to maximize the utilization of the projector in viewing rooms of a movie theater or the like and to reduce the installation costs for stereoscopic image projection and also to reduce crosstalk between left and right images, compared to the conventional LCD shutter method, thereby realizing more excellent stereoscopic images.

The following table shows comparisons of the stereoscopic image projection system using the single-projector circular polarization filter module according to the above embodiments of the invention with other systems.

TABLE 1

| Classification | | Advantages | Problems |
|---|---|---|---|
| DUAL PROJECTOR | linear polarization filter | Easy construction in short time. Implementation of excellent stereoscopic quality. | Low utilization in theater. Increase in projector installation costs. Left and right image conformity problem. Limited viewing angle. |
| | circular polarization filter | Easy construction in short time. Implementation of excellent stereoscopic quality. Improvement in viewing angle. | Low utilization in theater. Increase in projector installation costs. Left and right image conformity problem. |
| SINGLE PROJECTOR | LCD shutter | Improvement in utilization in theater. Improvement in left and right image conformity. Improvement in viewing angle. | Occurrence of crosstalk. Lowest stereoscopic quality. |
| | circular polarization filter | Improvement in utilization in theater. Improvement in left and right image conformity. Improvement in viewing angle. Reduction in occurrence of crosstalk | Possibility of occurrence of crosstalk compared to dual projector method. |

As shown in Table. 1, the circular polarization filtering method according to the invention overcomes the problem of utilization in viewing rooms of a movie theater and the problem of conformity of left and right images in the single projector method and overcomes the limited viewing angle problem in the method using linear polarization filters and also significantly reduces the problem of crosstalk that seriously occurs in the LCD shutter method.

Although the circular polarization filtering method according to the invention has a problem of the possibility of occurrence of crosstalk in contrast to the dual projector method since circular polarization filters are used, its crosstalk problem is much less serious than that in the LCD shutter method and the crosstalk problem can be overcome to some extent by setting the light shielding region between the left and right image filters as shown in FIG. 5.

Figure 10:
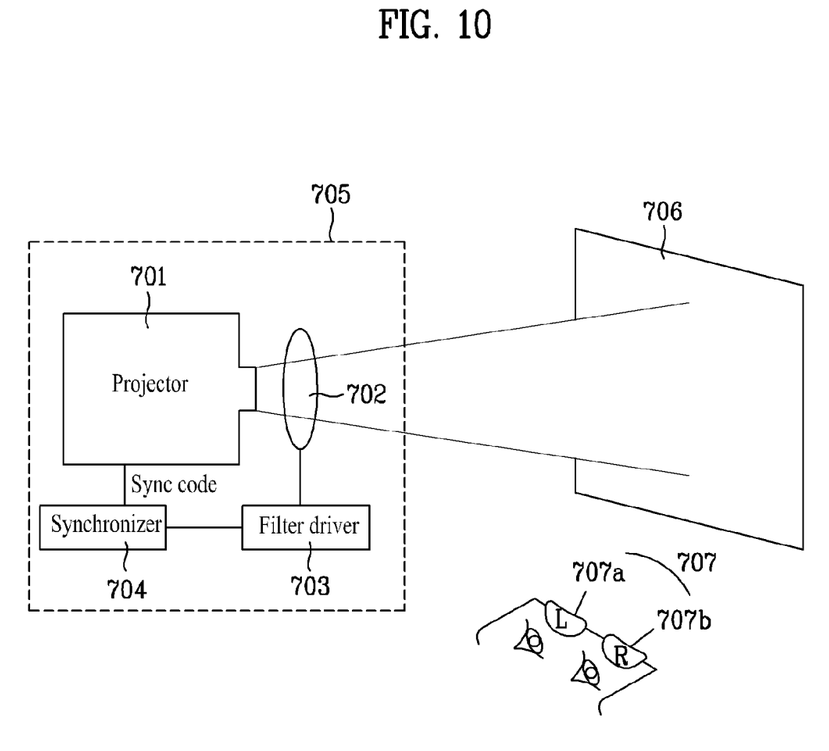
FIG. 10 illustrates an overall structure of a single-projector circular polarization filter type stereoscopic image projection system according to an embodiment of the invention.

FIG. 10 illustrates an overall structure of a single-projector circular polarization filter type stereoscopic image projection system according to an embodiment of the invention.

As shown in FIG. 10, the single projector circular polarization filter type stereoscopic image projection system according to the embodiment of the invention includes a stereoscopic image projector system 705, a screen 706, and polarizing glasses 707 as described above. The stereoscopic image projector system 705 emits left and right images according to the polarization method. The left and right images are projected on the screen 705. The left and right images selectively pass through the polarization glasses 707.

The stereoscopic image projector system 705 is characterized by including a single projector 701, a circular polarization filter module 702, and a filter driver 703 as described above. The single projector 701 sequentially emits left and right images. The circular polarization filter module 702 includes a left image polarization filter and a right image polarization filter. The filter driver 703 rotates and drives the circular polarization filter module 702 according to the timing synchronization of left and right image emissions of the projector. Accordingly, with only one projector, it is possible to project stereoscopic images with high conformity of left and right images and a wide viewing angle, while significantly reducing crosstalk compared to the LCD shutter method.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Industrial Applicability

The stereoscopic image projection system using the circular polarization filter module according to the invention increases its utilization in viewing rooms of a movie theater or the like and decreases installation costs since it uses only one projector and can also project stereoscopic images with high conformity of left and right images and a wide viewing angle while reducing crosstalk compared to the LCD shutter method. Thus, the stereoscopic image projection system according to the invention is suitable for use as a system for stereoscopic image projection in movie theaters.

The stereoscopic image projection system according to the invention can not only be used in its entirety but a stereoscopic image projector system including a projector, a circular polarization filter module, and a filter driver, included in the stereoscopic image projection system, can also be used standalone. In addition, since a conventional projector can be directly used for the stereoscopic image projection system, the circular polarization filter module and the filter driver can be used as standalone apparatuses for the stereoscopic image projection system.

The invention claimed is:

1. A stereoscopic image projector system comprising:
a projector configured to sequentially emit left and right images of stereoscopic image content;
a circular polarization filter module configured to include a left image polarization filter region and a right image polarization filter region, and a light shielding region located between the left image polarization filter region and the right image polarization filter region;
a filter driver configured to drive the circular polarization filter module according to timing synchronization of the left and right image emissions of the projector such that the left image polarization filter region is located at an emission hole of the projector when the projector emits the left images of stereoscopic image content and the right image polarization filter region is located at the emission hole of the projector when the projector emits the right images of stereoscopic image content, by rotating the circular polarization filter module; and
a sensor configured to detect a boundary between the left image polarization filter region and the right image polarization filter region, wherein a position of the sensor is adjusted according to a size of left and right images emitted by the projector.

2. The stereoscopic image projector system according to claim 1, further comprising a synchronizer for acquiring information on the timing synchronization of the left and right image emissions of the projector and providing the timing synchronization to the filter driver.

3. The stereoscopic image projector system according to claim 1, further comprising a frame for fixing and adjusting positions of the projector and the circular polarization filter module.

4. The stereoscopic image projector system according to claim 3, wherein the frame controls the positions of the projector and the circular polarization filter module to control whether the stereoscopic image projector system is to project a two-dimensional (2D) image or a three-dimensional (3D) image.

5. The stereoscopic image projector system according to claim 1, wherein the stereoscopic image content sequentially includes the left and right images to be emitted by the projector, and the projector receives the stereoscopic image content and sequentially emits the left and right images of the stereoscopic image content.

6. The stereoscopic image projector system according to claim 1, wherein the circular polarization filter module further includes:
 a measurement means for measuring the size of left and right images emitted by the projector; and
 a position determination means for determining the position of the sensor according to the measurement of the measurement means.

7. The stereoscopic image projector system according to claim 1, wherein the left image polarization filter region of the circular polarization filter module include a plurality of the left image polarization filters and the right image polarization filter region of the circular polarization filter module includes a plurality of the right image polarization filters.

8. The stereoscopic image projector system according to claim 7, wherein each of the plurality of left image polarization filters and the plurality of right image polarization filters has a center angle decreased as a number of the left image filters and a number of the right image filters increase.

9. An apparatus for a single projector type stereoscopic image projection system comprising a projector, the projector sequentially emitting left and right images of stereoscopic image content, the apparatus comprising:
 a circular polarization filter module configured to include a left image polarization filter region and a right image polarization filter region, and a light shielding region located between the left image polarization filter region and the right image polarization filter region;
 a filter driver configured to drive the circular polarization filter module according to timing synchronization of the left and right image emissions of the projector such that the left image polarization filter region is located at an emission hole of the projector when the projector emits the left images of stereoscopic image content and the right image polarization filter region is located at the emission hole of the projector when the projector emits the right images of stereoscopic image content, by rotating the circular polarization filter module; and
 a sensor configured to detect a boundary between the left image polarization filter region and the right image polarization filter region, wherein a position of the sensor is adjusted according to a size of left and right images emitted by the projector.

10. The apparatus according to claim 9, further comprising a synchronizer for acquiring information on the timing synchronization of the left and right image emissions of the projector and providing the timing synchronization to the filter driver.

11. The apparatus according to claim 9, further comprising a frame for fixing and adjusting positions of the projector and the circular polarization filter module.

12. The apparatus according to claim 11, wherein the frame controls the positions of the projector and the circular polarization filter module to control whether the stereoscopic image projection system is to project a two-dimensional (2D) image or a three-dimensional (3D) image.

13. A stereoscopic image projection system comprising:
 a stereoscopic image projector system for emitting left and right images of stereoscopic image content;
 a screen on which the left and right images of the stereoscopic image content are projected; and
 polarization glasses through which the left and right images of the stereoscopic image content selectively pass,
 wherein the stereoscopic image projector system comprises:
 a projector configured to sequentially emitting the left and right images of the stereoscopic image content;
 a circular polarization filter module including a left image polarization filter region and a right image polarization filter region, and a light shielding region located between the left image polarization filter region and the right image polarization filter region;
 a filter driver configured to drive the circular polarization filter module according to timing synchronization of the left and right image emissions of the projector such that the left image polarization filter region is located at an emission hole of the projector when the projector emits the left images of the stereoscopic image content and the right image polarization filter region is located at the emission hole of the projector when the projector emits the right images of the stereoscopic image content, by rotating the circular polarization filter module; and
 a sensor configured to detect a boundary between the left image polarization filter region and the right image polarization filter region, wherein a position of the sensor is adjusted according to a size of the left and right images emitted by the projector.

14. The stereoscopic image projection system according to claim 13, wherein the stereoscopic image projector system further comprises:
 a frame for fixing and adjusting positions of the projector and the circular polarization filter module.

15. The stereoscopic image projection system according to claim 14, wherein the frame controls the positions of the projector and the circular polarization filter module to control whether the stereoscopic image projection system is to project a two-dimensional (2D) image or a three-dimensional (3D) image.

16. The stereoscopic image projection system according to claim 13, wherein the circular polarization filter module further includes:
 a measurement means for measuring the size of left and right image emitted by the projector; and
 a position determination means for determining the position of the sensor according to the measurement of the measurement means.

17. The stereoscopic image projection system according to claim 13, wherein the left image polarization filter region of the circular polarization filter module includes a plurality of the left image polarization filters and the right image polarization filter region of the circular polarization filter module includes a plurality of the right image polarization filters,
  wherein each of the plurality of left image polarization filters and the plurality of right image polarization filters has a center angle decreased as a number of the left image filters and a number of the right image filters increase.

18. The apparatus according to claim 9, wherein the circular polarization filter module further includes:
  a measurement means for measuring the size of left and right images emitted by the projector; and
  a position determination means for determining the position of the sensor according to the measurement of the measurement means.

19. The apparatus according to claim 9, wherein the left image polarization filter region of the circular polarization filter module includes a plurality of the left image polarization filters and the right image polarization filter region of the circular polarization filter module includes a plurality of the right image polarization filters.

20. The apparatus according to claim 19, wherein each of the plurality of left image polarization filters and the plurality of right image polarization filters has a center angle decreased as a number of the left image filters and a number of the right image filters increase.

* * * * *